(12) United States Patent
Greenhill

(10) Patent No.: US 6,250,618 B1
(45) Date of Patent: Jun. 26, 2001

(54) CURVED WAVE SHIM

(75) Inventor: Michael Greenhill, Highland Park, IL (US)

(73) Assignee: Smalley Steel Ring Company, Wheeling, IL (US)

( * ) Notice: Subject to any disclaimer, the term of this patent is extended or adjusted under 35 U.S.C. 154(b) by 0 days.

(21) Appl. No.: 09/393,454

(22) Filed: Sep. 10, 1999

(51) Int. Cl.$^7$ .................... F16F 1/20; F16F 1/34
(52) U.S. Cl. ................ 267/162; 267/180; 267/165; 267/160
(58) Field of Search .................. 267/154, 180, 267/167, 165, 161, 162, 164, 272, 160

(56) References Cited

U.S. PATENT DOCUMENTS

| | | |
|---|---|---|
| 1,290,180 | 1/1919 | Halbleib . |
| 1,435,039 | 11/1922 | Woodward . |
| 2,438,163 | 3/1948 | Haling . |
| 2,646,108 | 7/1953 | Norman . |
| 2,886,380 * | 5/1959 | Lambeek ........................ 267/162 |
| 2,982,323 | 5/1961 | Vossloh et al. . |
| 3,015,482 * | 1/1962 | Maker ........................ 267/165 |
| 3,021,129 * | 2/1962 | Maker ........................ 267/165 |
| 3,114,388 * | 12/1963 | Hoen ........................ 267/165 |
| 3,275,311 | 9/1966 | Sichel . |
| 3,582,018 * | 6/1971 | Tirabassi ........................ 267/272 |
| 3,587,803 * | 6/1971 | Sugiura ........................ 267/165 |
| 3,666,000 | 5/1972 | Bleen et al. . |
| 3,674,251 | 7/1972 | Tirabassi . |
| 4,752,178 | 6/1988 | Greenhill . |
| 4,852,704 | 8/1989 | Brockenbrough et al. . |
| 5,501,118 | 3/1996 | Benton . |
| 5,558,393 | 9/1996 | Hwakins et al. . |
| 5,639,074 * | 6/1997 | Greenhill et al. ................ 267/162 |
| 5,803,444 | 9/1998 | Shibuya et al. . |
| 5,960,923 * | 10/1999 | Araki ................ 267/163 |
| 6,068,250 * | 5/2000 | Hawkins et al. ................ 267/162 |

OTHER PUBLICATIONS

Smalley Steel Ring Company Engineering and Parts Catalog, Jan. 1998.*

Pp. 1–8, Engineering + Parts Catalog—Spirawave Wave Springs, Smalley Steel Ring Co. Jan. 1998.

* cited by examiner

Primary Examiner—Robert J. Oberleitner
Assistant Examiner—Devon Kramer
(74) Attorney, Agent, or Firm—Vedder, Price, Kaufman & Kammholz

(57) ABSTRACT

A curved wave shim is formed from a flat elongated wire strip which follows a sinusoidal wave path that includes a series of waves spaced about the curved wave shim path, each wave having a shoulder portion which bears against generally parallel surfaces of the working elements positioned on a shaft or in a cylinder bore. The shim fits in a rectangular groove formed either on a shaft or in a cylinder bore, the axial height of the groove being slightly greater than the distance between successive wave crests and troughs.

10 Claims, 3 Drawing Sheets

CURVED WAVE SHIM

BACKGROUND OF THE INVENTION

This invention relates generally to compression wave springs and more particularly to a spring device made from an elongated flat strip which is curved into an arcuate shape and formed into a wave configuration.

Compression wave springs have been widely used in many fields. Wave springs are used to exert a force on working elements in a mechanical assembly, and are typically associated with cylindrical applications. The function of the wave spring is to preload the assembly so that any play between elements of the assembly, because of dimensional variation in each assembly, is removed.

Conventional wave springs often cause installation problems because they form a 360° arcuate shape. The 360° arcuate shape wave spring often cannot be used in some applications because it would interfere with an object located within the space that a conventional wave spring would have to occupy. This can be illustrated with a common example such as a bore that has a keyway and a key which generally fills the keyway and the key extends into the bore. Obviously, the key would interfere with a 360° wave spring placed around the edge of the bore. Another example of a conventional wave spring proving to be inadequate is for the situation when a shaft is moving axially between three dowel pins wherein a wave spring must be located on the outside of the shaft. These problems have caused the spring users to ask the manufacturers and engineers to specially design and construct springs often usable in only one specific application. By doing this, the time required to design and produce the springs increases and the cost of each spring skyrockets.

Accordingly, it is a general object of the present invention to provide a new and improved curved wave shim for use on cylindrical shafts or in cylinder bores.

It is a further object of the present invention to provide a curved wave shim having a series of waves which include shoulder portions which abut against the working element and the retaining ring groove.

Yet another object of the invention is to provide a low cost easy to manufacture curved wave shim used for multiple applications.

SUMMARY OF THE INVENTION

In accordance with the preferred embodiment, one present embodiment of the invention includes a flat wire strip that is edgewound and cut to have a specific arc length. The flat wire strip is formed to include a wave pattern along its arc length. The wave pattern preferably includes about one wave, with a sinusoidal wave being the preferred wave pattern.

The curved wave shim preferably includes at least one crest and trough so that shim support surfaces are formed in the shim which act against opposing surfaces in the environment in which the shim is used. This crest and trough combination also gives the shim the characteristics of a curved leaf spring and may be used as a spring segment in curved groove variations where multiple curved wave shims are used generally adjacent to each other forming a circular shape wave spring.

For purposes of this disclosure, "shim" means an item used to fill in space between things as for support, leveling or adjustment of fit.

These and other objects, features and advantages of the present invention will be clearly understood through a consideration of the following detailed description.

BRIEF DESCRIPTION OF THE DRAWINGS

In the course of this description, reference will be made to the attached drawings in which.

DETAILED DESCRIPTION OF THE PREFERRED EMBODIMENT

Figure 3:
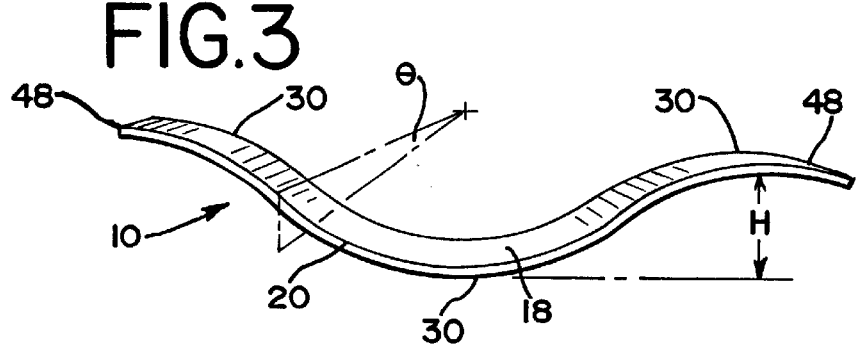
FIG. 3 is a perspective view of one of one curved wave shims shown in FIGS. 1 and 2.

Referring now to the drawings, and in particular FIG. 3, a curved wave shim 10 is formed from a single, flat, elongated metal strip 18 which is wound about one of its lateral edges 20 in a generally circular pattern. The strip 18 is then formed into a continuous wave path 24 composed of at least about one full wave period $P_1$ of a sinusoidal shape. The period of the wave path is preferably constant throughout curved wave shim 10; however, it may be varied as well.

The wave path of the curved wave shim 10 is introduced during the edge winding of the shim and so presents a uniform, smooth and continuous sinusoidal path. This path and other suitable wave paths form support surfaces or shoulder portions 30 in the shim which engage a surface 14 (FIG. 2) of the closest working element 12 (FIG. 2) and a wall 28 (FIG. 2) of the shaft groove composing the working element surface 14. The edge winding of the curved wave shim 10 avoids any abrupt peaks or ridges which are typical by-products of a die stamping process. The metal strip 18 is edge wound at a slight radial angle θ with respect to the inner and outer edges of the shim and the plane on which the curved wave shim 10 lies so that the transverse surfaces of the strip 18 (including the shoulders 30) are angled either upwardly or downwardly. Because the strip 18 is angled, when the ring is compressed to its maximum working height $H_D$ (equal to a maximum of 80% undeflected height $H_u$), the plane of the shoulders 30 will become substantially parallel to the working element's surface 14.

The curved wave shim 10 preferably has at least two wave crests 25 and one wave trough 27 or two wave troughs 27 and one wave crest 25 to prevent bindings of its ends 48 during installation and use. By having two crests or troughs, the curved wave shim 18 is given a stable configuration. The curved wave shim preferably has only three contact points: either one peak or one valley and two other contact points disposed on opposite ends 48 of curved wave shim 10. The ends 48 of curved wave shim 10 only need to be at a different elevation than the peak or trough from which they extend so that height H has some viable extension. In doing so, curved wave shim 10 will have a height H which may be fit into a shaft or cylinder groove.

If less that one full wave 22 of a sinusoidal wave is used in the fabrication of the curved wave shim 10, preferably ends 48 are free of any burrs and/or sharp edges and are generally rounded in shape. By smoothing, rounding, deburring or any other method known to someone having ordinary skill in the art, the ends 48 are prevented from scratching or otherwise damaging adjacent surfaces when ends 48 contact surface 14 or working element 12 and binding which may cause abnormal deflections in the shim thereby damaging it. In either case, when curved wave shim 10 is deflected so that H changes, it causes the ends 48 to move in generally combined radial and circular directions.

Figure 7:
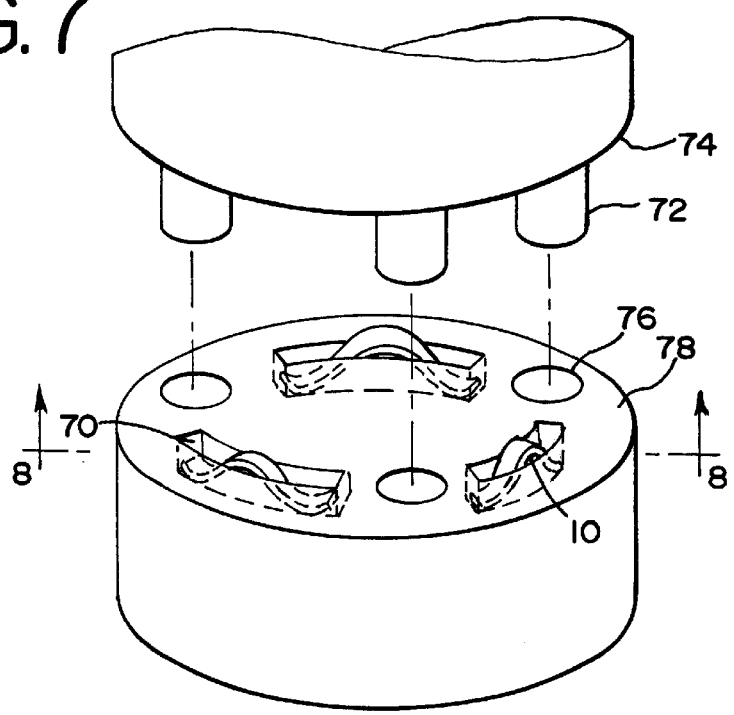
FIG. 7 is a perspective view of curved wave shims of the present invention in a third working environment shown recessed on a working surface; and, FIG. 8 is a cross-sectional view of FIG. 7.
Figure 8:
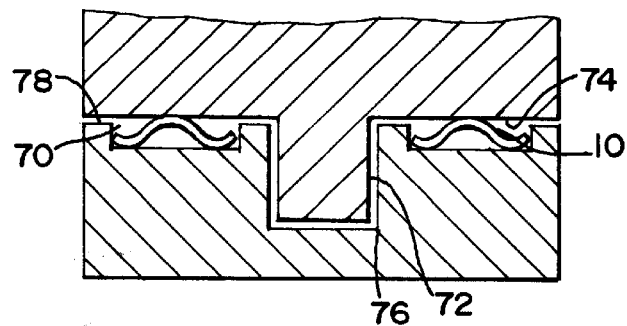

The curved wave shim has an arc length that is preferably less than 180°. Preferably there are at least 2 curved wave shims 10 so that even pressure is applied to the working element 12 and contact surface 14, although in some applications only one is needed. In another embodiment three curved wave shims are spaced about a cylinder bore or shaft so as to provide generally even pressure around the entire circumference of the restrained object as shown in FIGS. 7 and 8. In yet another embodiment, curved wave shims may be less than 90° in arc length so that at least three curved wave shims may be used in an application, for example, placed around the circumference of the cylinder bore of shaft.

In FIGS. 7 and 8, the curved wave shims 10 are placed in corresponding recesses 70 and have a height such that the shims extend partially above the top of the recess 70. Guide pins 72, extending from upper surface 74, move axially with upper surface 74 so that guide pins 70 fit into lower surface openings 76 of lower surface 78. As upper surface 74 moves proximate to lower surface 78, shim 10 contacts both upper and lower surfaces so that a force is applied to keep the surfaces from touching. Preferably, the guide pins 70 are positioned in openings 76, whereas, the only contact between the upper and lower surfaces is through the shim 10.

Figure 6:
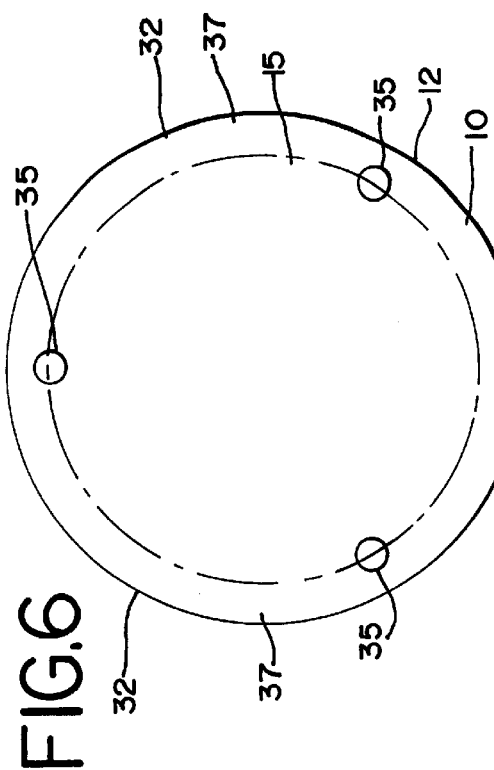
FIG. 6 is a sectional view of FIG. 5 taken along lines 5—5 thereof.
Figure 5:
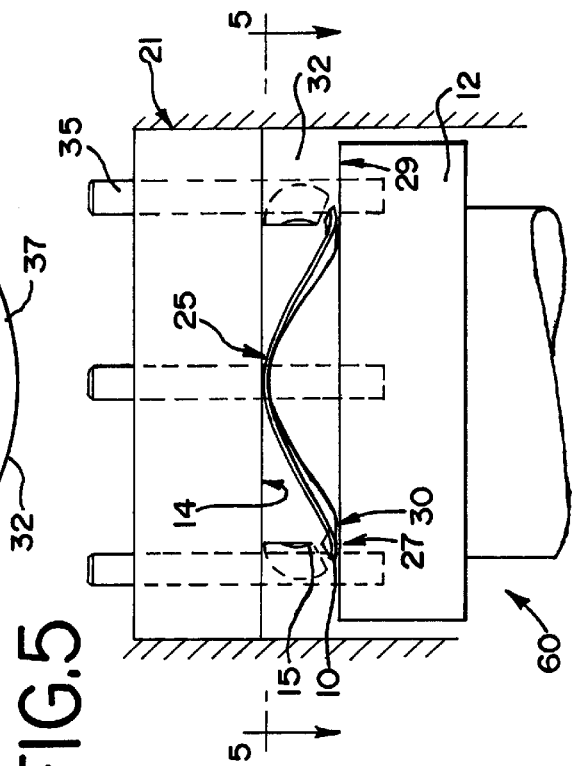
FIG. 5 is a front elevational view of multiple curved wave shims of the present invention shown in a different working environment, wherein the shims are assembled around pins on an axial shaft.

In a different embodiment shown in FIGS. 5 & 6, the curved wave shim 10 fits within an annular cavity 32 as shown in FIG. 5. Annular cavity 32 has a generally rectangular cross-section which is formed in either a cylindrical shaft 15 or cylinder bore 16. The annular cavity 32 is not continuous on the shaft or in the bore through 360°. Rather, the support pins 35 serve to space the working element 12 apart from the opposing surface 29. The pins 35, effectively shown in FIG. 5, do not allow a curved wave spring to be placed in the cavity 32, because they divide the cavity 32 into segments 27 with such segments 37 being shown in FIG. 6. The pins 35 thus interfere with the continuity of the cavity 32. Due to the interruptions by the pins 35, only a curved wave spring segment, such as the shim 10, may be positioned in the cavity segments 37. In one application, as shown in FIG. 6, the assembly 60 consists of three pins 35 spaced equally around circumference of the working element 12 creating essentially three distinct cavities 32 into which three curved wave shims may be positioned to support upper member 21.

Figure 2:
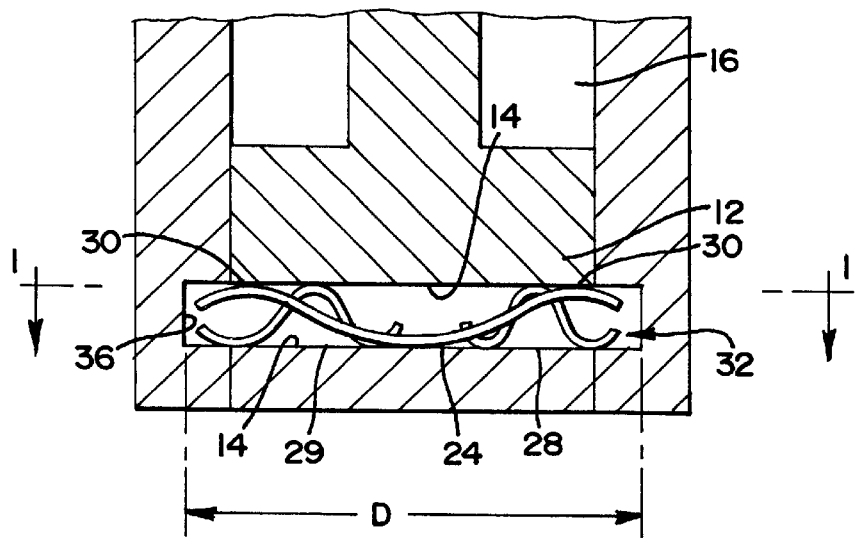
FIG. 2 a cross-sectional view of FIG. 1, taken along lines 2—2 thereof, illustrating the wave shim in place within the bore and supporting a work element.

As shown in FIGS. 2 and 5, the curved wave shim 10 is adapted to restrain working elements 12 used in association with either a generally cylindrical shaft 15 or in a generally cylindrical bore 16. To accommodate the curved wave shim 10, each shaft or bore is provided with an annular cavity 32 having a generally rectangular cross-sectional configuration. The inner walls 28 are preferably parallel to the element surface 14 so as to provide the curved wave shim 10 with a solid retaining surface to engage.

The height of the curved wave shim 10 is preferably slightly less than the axial height of annular cavity 32 so that the wave crest 25 and wave troughs 27 of the curved wave shim fit somewhat loosely within the walls of the annular groove 32 to allow for greater ease of installation. Because the wave configuration of the shim allows it to undergo a predetermined amount of compression, the shim 10 can be compressed when it is installed proximate to the working element 12 if the element is slightly oversized or so positioned on the shaft assembly. When curved wave shim 10 is less than one full wave, the undeflected free height H of the curved wave shim 10 prior to any loading will be equal to the distance between ends 48 and the wave crest 25 or wave trough 27 surrounded by ends 48. Otherwise, the undeflected free height of the curved wave shim 10 prior to any loading equals the distance between successive wave crests 25 and wave troughs 27. That distance or height H is also slightly less than the axial height of cavity 32. When installed, the curved wave shim shoulder portions 30 will abut the surface 14 of working elements 12 and the opposing wall 29 of cavity 32.

Figure 1:
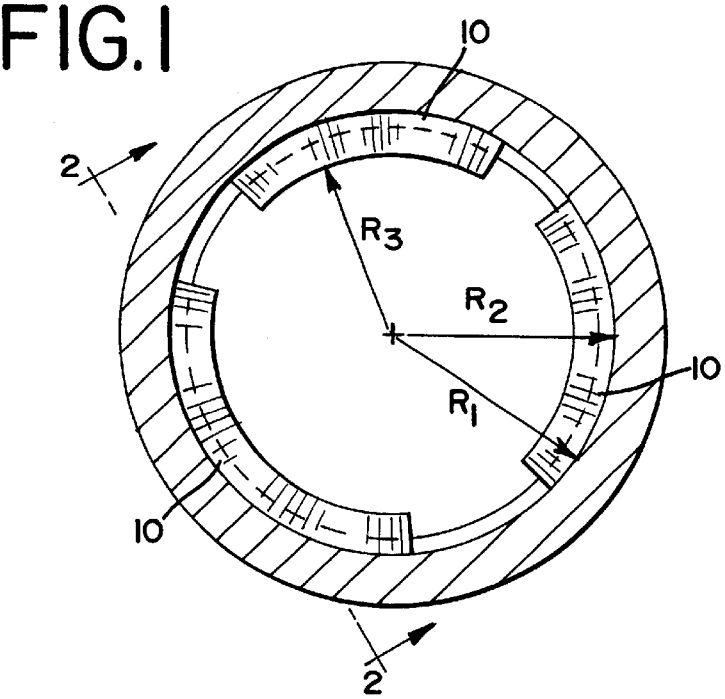
FIG. 1 is a bottom plan view of a curved wave shim constructed in accordance with the principles of the present invention shown in place inside of a cylindrical bore, the view being taken from the bottom of FIG. 2.
Figure 4A:
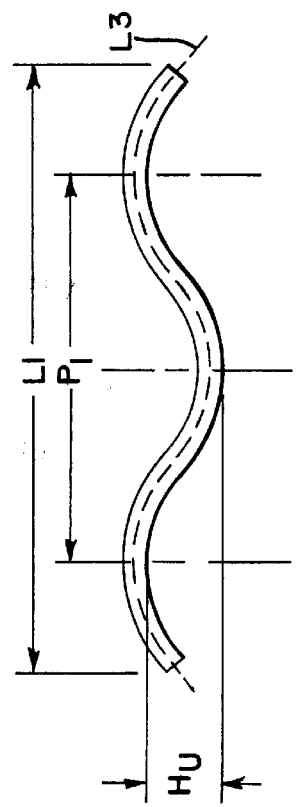
FIG. 4A is a front elevational view of the curved wave shim of FIG. 3, illustrating the curved wave shim in an uncompressed condition.
Figure 4B:
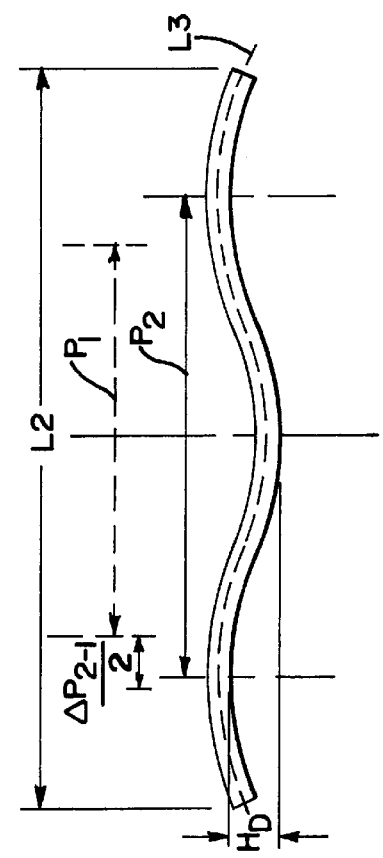
FIG. 4B is the same view as FIG. 3, but illustrating the curved wave shim in a compressed condition.

When curved wave shim 10 is used in internal applications such as the cylinder bore 16 as depicted in FIG. 2, it is preferred that the curved wave shim 10 as shown in FIG. 1 is formed, where free spring outer radius $R_1$ is slightly less than the back groove radius $R_2$ of annular cavity 32 formed in cylinder bore 16. When the shim 10 is compressed, as depicted in FIGS. 4a and 4b, the shim 10 will move radially outward toward the bore groove diameter D and will increase the free state arc length $L_1$ to a compressed arc length $L_2$, where $L_2$ is always greater than $L_1$ by an amount based fundamentally upon three factors: free height ($H_o$), free spring outer radius ($R_1$), full wave period length (P). These dimensions geometrically control the linear length of material in the waveform as illustrated by dotted line $L_3$. An increase to any of these dimensions consequently increases the value $L_2$ and increases the difference between $L_1$ and $L_2$. Therefore, the maximum outer diameter of the shim must also be equal to or slightly less than the groove diameter D when shim 10 is compressed an amount not exceeding 80% of its total available axial deflection.

Similarly, the wave period of the wave spring will change. In FIG. 4A, the shim 10 has a period $P_1$ in its uncompressed state. When compressed, the shim 10 has a period $P_2$ shown in FIG. 4B, which is greater than $P_1$. The difference between the periods of the shim shown in FIG. 4A and 4B is $\Delta P_{2-1}$.

Figure 9:
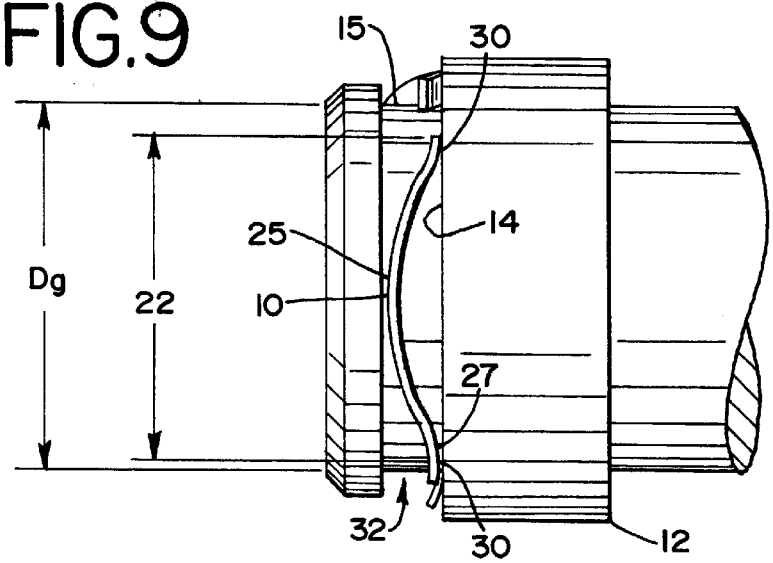
FIG. 9 is a side view of the curved wave shim of the present invention in an external application on a shaft.

In external or shaft applications as shown in FIG. 9, it is desirable that the free spring inner radius $R_3$ be equal to or slightly greater than the shaft groove diameter $D_g$ so that the spring in its free state remains essentially concentric to the shaft and as the spring is compressed to a maximum of 80% of its undeflected height. Therefore, when $R_3$ increases, the greater shaft groove diameter D prevents any engagement with the shim 10, thereby preventing any binding or hangup.

In another embodiment of the invention, curved wave shims may be placed adjacent to each other. Depending on the placement, the overall spring properties of the system are affected. For example, even as the gap between curved wave shims approaches zero so that a plurality of curved wave shims approximate a 360° curved wave spring, the differences in spring characteristics between the forms are readily apparent. Specifically, the plurality of curved wave shims have less spring force than a continuous wave spring. When the curved wave shims overlap in an adjacent position, the spring force of the shims will better proximate the force of the continuous wave spring than spaced wave springs. In order to reproduce the same spring force, the characteristics of the shims must be adjusted (e.g., materials, width, thickness, period) by one having ordinary skill in the art.

It should be further understood by those of ordinary skill in the art that the foregoing presently preferred embodiments are exemplary only and that the intended description thereof is likewise by way of words of example rather than by words of limitation and their use does not preclude inclusion of such modifications, variations and/or additions to the present invention as would be readily apparent to one of ordinary skill in the art, the scope of the present invention being set forth in the appended claims.

What is claimed is:

1. A curved wave shim for use in circular spring applications, formed on a predetermined radius, comprising: an edge wound flat metal strip extending in an arc length of not greater than 180°, the metal strip being formed in a wave pattern, lengthwise along the arc length and having at least three contact points disposed on the strip and spaced apart from each other within the wave pattern, wherein a first and third contact points are disposed at opposite ends of said metal strip and a second contact point is disposed on said metal strip between said first and third contact points, said second contact point being located on a first surface of said metal strip, and said first and third contact points being located on a second opposing surface of said metal strip, each of said contact points including solid shoulder portions of said strip, without any openings formed therein.

2. A curved wave shim according to claim 1, wherein said arc length is no greater than 90°.

3. A curved wave shim according to claim 2, wherein said first and third contact points are free of burrs and sharp edges.

4. A curved wave shim according to claim 3, wherein a period of said wave pattern is constant.

5. A curved wave shim according to claim 4, wherein said wave pattern is generally sinusoidal.

6. A curved wave shim, comprising: an edge-wound, flat metal strip having a solid body portion of a preselected width extending between inner and outer edges of the strip and an arc length of about 90° extending between first and second ends of said strip, said strip having a wave pattern formed therein that extends lengthwise along said strip, the wave pattern including about one complete wave cycle therein, said strip being edge-wound so as to impart an angle to the strip body portion so that said strip inner and outer edges are not parallel to each other when said shim is not loaded by a work element.

7. A curved wave shim according to claim 6, wherein said wave pattern has a constant period.

8. A curved wave shim, comprising: an edge wound metal strip shaped in a sinusoidal wave pattern with three contact points disposed thereon between opposing ends of the strip, said contact points including solid shoulder portions, said three contact points including either two wave crests and one trough, or two troughs and one wave crest, wherein said contact points abut against a working element and an opposing surface during use of said shim, the strip further having a length that extends along an arc of preselected length, said strip further having inner and outer radial edges extending between said opposite ends, the inner and outer radial edges being angularly displaced from each other when loaded by a working element.

9. A curved wave shim according to claim 8, wherein said curved wave shim has an arcuate length of no greater than 180°.

10. A curved wave shim according to claim 8, wherein said curved wave shim has an arcuate length no greater than 90°.

* * * * *